May 26, 1942.  E. W. SPARLING  2,284,306
SOUND RECORDING AND REPRODUCING SYSTEM
Original Filed May 24, 1937   7 Sheets-Sheet 1

INVENTOR.
Elliott W. Sparling
BY
ATTORNEY.

May 26, 1942. E. W. SPARLING 2,284,306
SOUND RECORDING AND REPRODUCING SYSTEM
Original Filed May 24, 1937 7 Sheets-Sheet 6

INVENTOR.
Elliott W. Sparling
BY
ATTORNEY.

Patented May 26, 1942

2,284,306

UNITED STATES PATENT OFFICE 2,284,306

SOUND RECORDING AND REPRODUCING SYSTEM

Elliott W. Sparling, Los Angeles, Calif., assignor, by mesne assignments, to Theodore R. Gillenwaters and Samuel Steelman, as trustees for M. Elizabeth Gillenwaters Refiled for abandoned application Serial No. 144,508, May 24, 1937. This application September 8, 1941, Serial No. 410,103

19 Claims. (Cl. 179—6)

This invention comprehends the provision of a combined sound recording, reproducing and communication system wherein means of communication including electrically connected stations affording station-to-station communication, pick-up means for receiving signals from electrical transmitting means such as a telephone system, sound recording means, sound reproducing means, and control means or various combinations of said component means may be combined to form a system subject to ready installation in offices, stores, residences, factories, etc. for selectively effecting station-to-station communication, and the recordation and reproduction of messages, instructions, conferences, dictation and other sounds and signals given, made or caused to be made by a person or persons at or adjacent to a station or stations or transmitted to the system through the pick-up means from telephone, telegraph, radio and like equipment.

An object of this invention is to provide a system such as described, which when characterized by a communication means comprising a plurality of electrically connected stations arranged for station-to-station communication, a recording means and a control means operable at the location of at least one of said stations for controlling the operation of said recording means, constitutes a highly efficient unit for facilitating the conduct and operation of business and other routines involving inter-office communications and the transmission, recordation and reproduction of conversations, messages, sounds, signals, etc. pertaining thereto.

Another object of this invention is to provide a system of the character described which is subject to complete control as to the selection and order of performance of its several functions, from one or more control stations, whereby an operator at such a station may at will engage in a conversation with or transmit a message to an operator at another station and yet selectively start or stop the recording and reproducing means while maintaining the communication means subject to station-to-station communication at all times.

An additional object of the invention is to provide a system such as described, wherein a telephone, radio or telegraph transmitted message, sound or signal, may be picked up from adjacent telephone, radio, or telegraph equipment without physical connection or in any manner interfering with such equipment and in such manner that incoming and outgoing messages, sounds and signals may be recorded or audibly reproduced at the time of transmission or reproduced later from the recording thereof.

A further object is to provide a system such as described which comprises a monitor unit including recording and reproducing means, control means, one of said communication stations and the inductive pick-up means; a master or remote control unit comprising another communication station having a microphone, a loud speaker and control switches for controlling the elements of the system, and sub-stations affording communication with one another and with the monitor and master units and under control of the latter, all of the stations having loud speaker means controlled from the master and monitor units for audibly reproducing the recorded sounds of said reproducing means as well as other signals transmitted to or by the system.

Another object is to provide a system such as described having means at the location of the recording and reproducing means and at one or more of the communication stations for indicating visibly the progress of the styli of said recording and reproducing means, whereby operators at said stations may readily ascertain the extent of operation of and be thus guided as to use of said recording and reproducing means.

Yet another object is to provide tell-tale signal means at one or more of the stations for visibly indicating the operativeness of other stations.

This invention also comprehends the installation of a communication station, the recording and reproducing means and the inductive pick-up means and control switches as a monitor unit in, for example, the secretary's room or office of an office suite which latter is equipped with an ordinary inter-office telephone system, the installation of a master or remote control unit comprising a communication station having a loud speaker, a microphone, a visual indicator showing the extent of operation of the recording means, and control switches coupled into electrical circuits of the system and for controlling the entire system, in another office for the use of the executive or office head, and possibly the installation of other communicating stations in other rooms of the office, as sub-stations, all, whereby, of the many functions thus made possible there may be carried out in a particularly efficacious manner the following:

1. Dictation and issuance of vocal instructions from the master station selectively to the monitor and sub-stations, 2. Station-to-station communication at the will of the operator at said stations, 3. Recordation of dictation, conferences, instructions, sounds and station-to-station conversations under control of the master and monitor station operators at all times, 4. Recordation of incoming and outgoing telephone calls, radio and telegraph messages, etc., at will and under control of the master and monitor operators without physical connection to or interfering with the telephone or like equipment, 5. Audible reproduction at the master or any other station or stations, under control of the master station operator, of recorded matter or of sounds and signals being transmitted in and to the system, 6. Station-to-station communication while an incoming or outgoing telephone message or signal is being recorded, 7. Simultaneous recordation and audible reception of telephone and like messages, made possible by ordinary use of the office telephone equipment while the recording means of the system is operating to record such messages, and 8. Recordation of telephone numbers called with automatic as well as other types of telephone or like equipment.

I have shown in the accompanying drawings a preferred form of a sound recording and reproducing system embodying my invention, subject however, to modification, within the scope of the appended claims, without departing from the spirit of my invention.

Referring to the drawings.

One embodiment of this invention comprises a system wherein a monitor station A provided with sound recording and reproducing means is electrically combined with inter-station communication means including a master or remote control station B and sub-station C or a plurality of any one or more thereof, and with pick-up means D which operates without physical connection or interference with telephone, telegraph or like equipment, to receive and transmit for recordation and audible reproduction the incoming and outgoing signals and sounds transmitted by such equipment.

Figure 1:
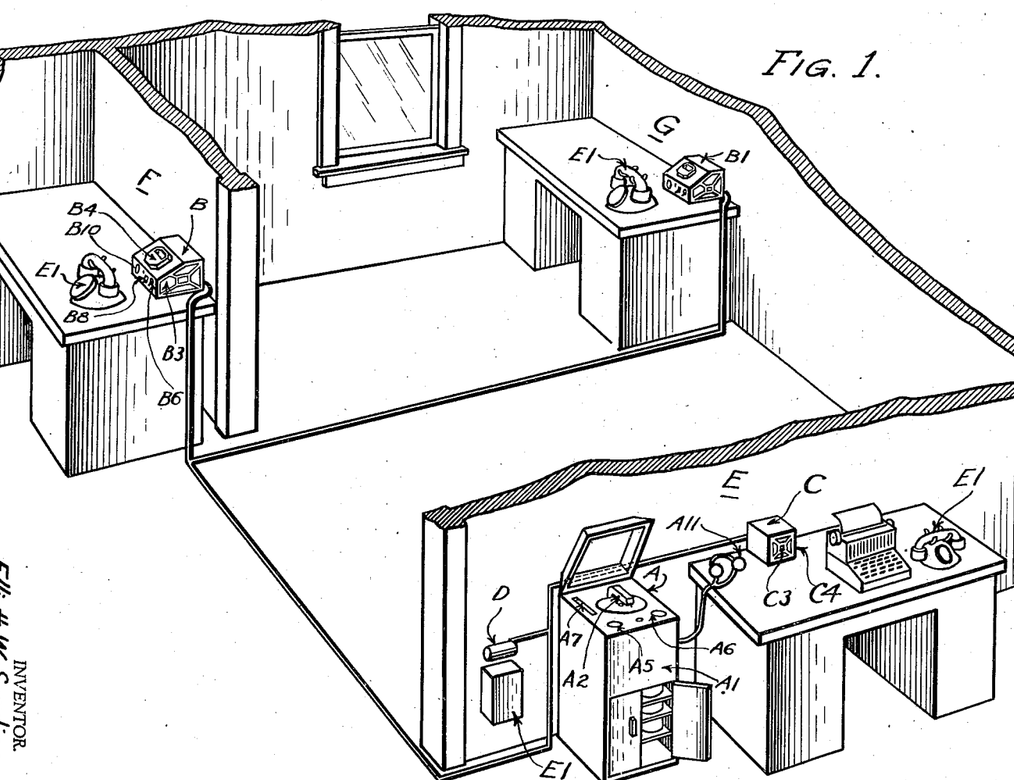
Fig. 1 represents a schematic perspective of a typical installation of the system of this invention as may be carried out in an office suite.

As shown in Fig. 1 the monitor station A may be considered as including one of the sub-stations C as a loud speaker therefor, also the pick-up means D, and may be installed in a room or office E of a suite, store or the like equipped with an ordinary telephone system E1. This provides for operation and control of the monitor unit and the entire system by a secretary or clerk at that station. A master station B and a similar station B1 may be placed on desks or otherwise installed in other rooms or offices as indicated at F and G respectively, for use of executives.

As will be hereinafter more fully described, each station is equipped with control means but the monitor and master stations have the major controls operable to selectively start and stop the recording and reproducing means and cause the pick-up means to receive and transmit signals for audible reproduction at a selected station or stations or for recordation.

Figures 2, 12:
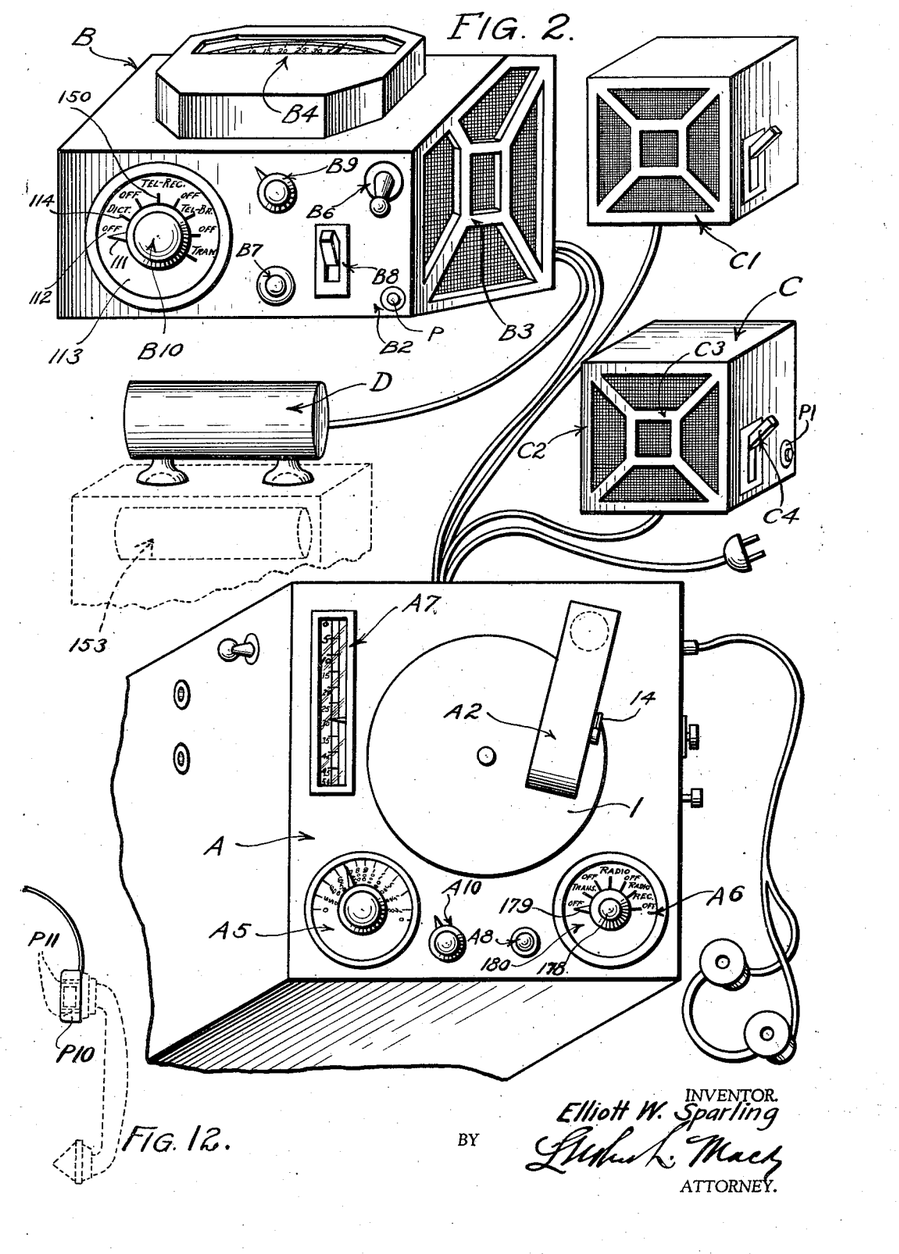
Fig. 2 is a schematic perspective of the system showing the units more in detail and a typical number and arrangement of units.
Fig. 12 is a front elevation of a modified form of telephone pick-up means.

As shown in Fig. 1 the station-to-station communication means may comprise the master station B, sub-station C, the latter forming a part of monitor station A, and a second master station B1. However instead of this arrangement the system may include, as shown in Fig. 2, the monitor station A, master station B, sub-station C and another sub-station C1 which, for example, may be installed in place of the master station B1. A plurality of any one or more stations may be used as within the scope of this invention and in most embodiments the system will essentially consist as particularly shown in the wiring diagrams and Figs. 3 and 4, a monitor station A, a master station B and a sub-station C or their equivalents.

*Monitor station*

Figure 5:
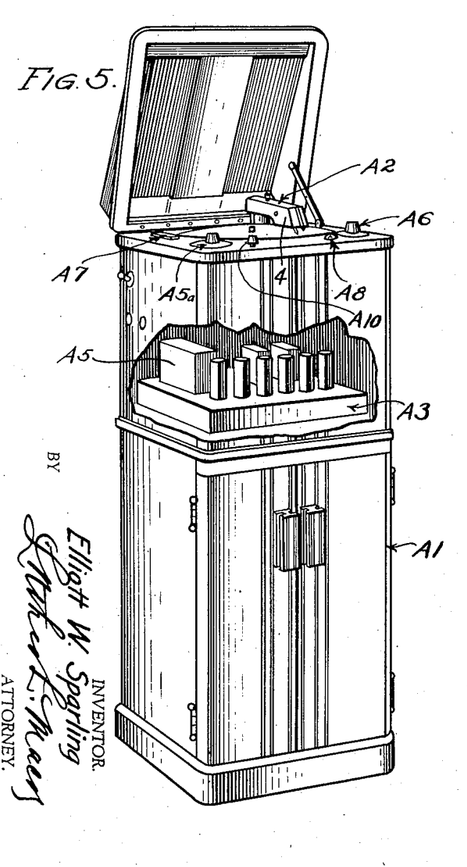
Fig. 5 is a perspective view of the monitor unit.
Figure 6:
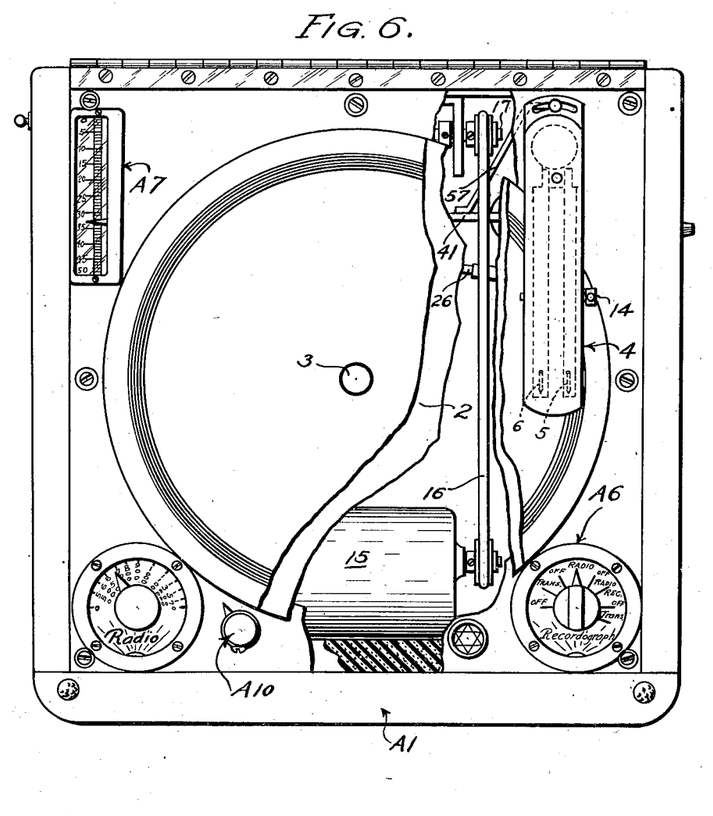
Fig. 6 is a top plan view of said monitor unit with the lid removed.

As here shown the monitor station or unit A comprises a cabinet A1 housing a recording and reproducing means A2, a thermionic amplifier unit A3, a radio receiving set A5 included in part in the unit A3 and having a tuning control A5a, a gang switch A6 for controlling the entire system, an indicator A7 for showing the extent of operation of the recording and reproducing means at all times, a tell-tale light signal A8 for visually indicating operation conditions of the system, a sub-station C which serves as a loud speaker, and a volume control A10. If desired earphones A11 may be used in connection with the monitor unit instead of or with the loud speaker of said station C.

*Master station*

As here shown the master station B (or B1) comprises a cabinet B2 containing a loud speaker unit B3 also serving as a microphone, an indicator B4 showing at all times the operating position of the recording and reproducing styli, a microphone B5 for use when recording from the master station, a switch B6 for connecting the speaker B2 in parallel with the speaker at another station, a tell-tale light signal B7 for indicating the operativeness of the monitor unit, a switch B8 for connecting the speaker A3 for use as a microphone, a volume control means B9 and a gang switch B10 corresponding to the gang switch A6 and for controlling the system as will be hereinafter more particularly described.

Sub-station

The sub-station C (C1) comprises a cabinet C2 housing a loud speaker unit C3 which may be connected in the circuit for use as a microphone through the manipulation of a switch C4 mounted on the exterior of the cabinet.

Recording and reproducing means

Figures 7, 8, 9, 10:
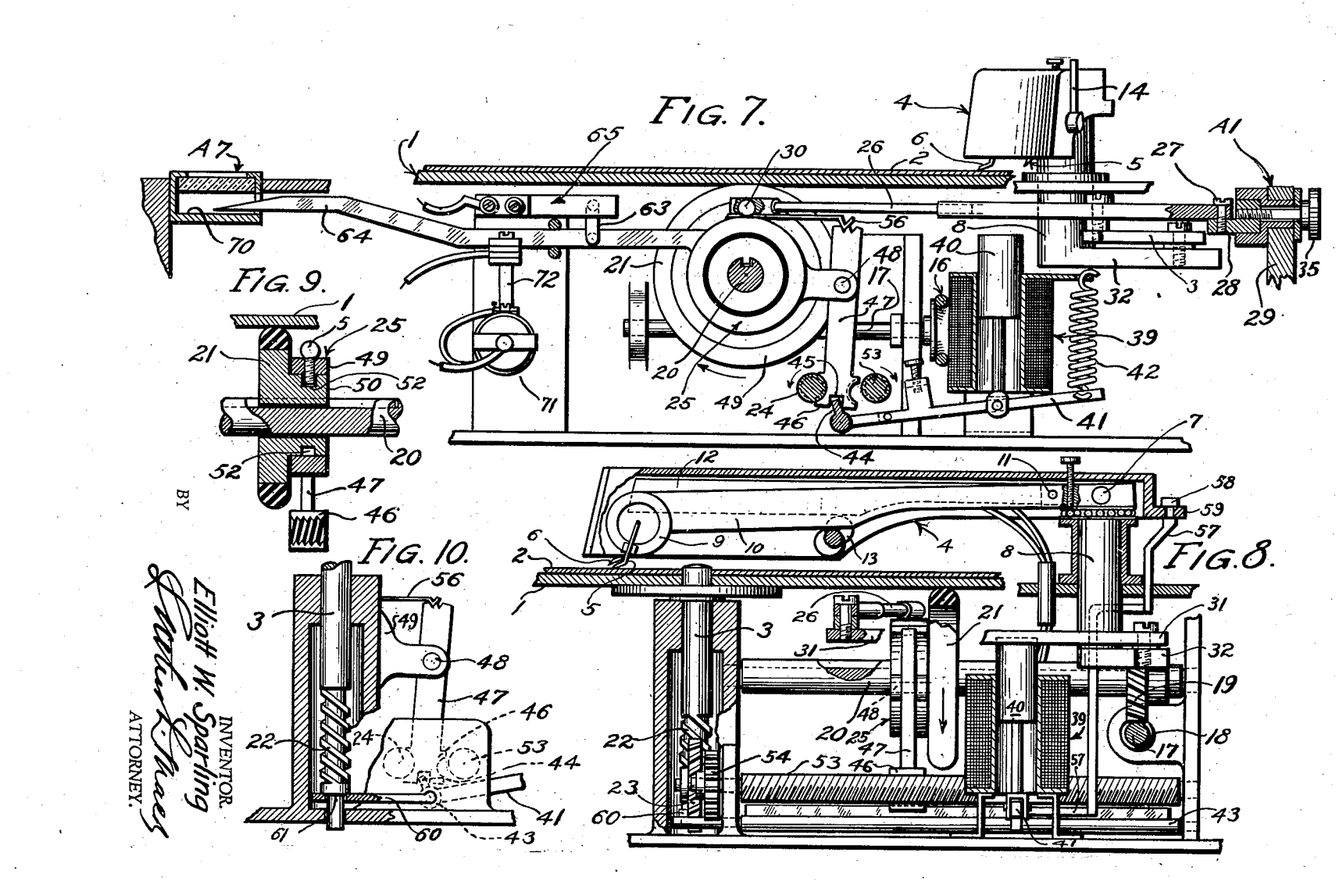
Fig. 7 is a fragmentary horizontal sectional view of the recording and reproducing mechanism.
Fig. 8 is a cross-sectional view of said mechanism taken at right angles to Fig. 7.
Fig. 9 is an enlarged fragmentary sectional view showing the frictional drive means for the turn table.
Fig. 10 is an enlarged fragmentary sectional view of drive means operative for controlling the movement of the reproducing and recording head.

Any suitable recording and reproducing means may be used in connection with the system of this invention, provided the same will be subject to remote control from a master station and also operative at the monitor station whereby for example, a master station operator may at will cause said means to record or reproduce sounds and messages originating within or transmitted to the system. As here shown a turntable 1 for rotatably supporting a record 2 is mounted upon a rotary post 3 suitably supported in the upper part of the cabinet A1. A combined recording and reproducing assembly 4 including recording and reproducing heads and styli 5 and 6 is secured by a pin 7 to a rotary post 8 so as to swing laterally and to pivot vertically relative to the post. The recording stylus 5 is carried by a magnetic head 9 mounted on an arm 10 which is pivoted as at 11 on the assembly 4 whereas the reproducing stylus 6 is carried by a head, not shown, and which is mounted on an arm 12 secured by the pivot means 11 on the assembly 4. These styli are selectively movable into and out of engagement with the record 2 by a suitable double cam means 13 having an operating handle 14 disposed on the side of the assembly 4.

Provision is made for increasing the recording capacity of the record and improving the quality of reproduction by using a drive means which causes the record to have a constant surface speed at the point of its contact with the stylus that is in operation. This drive means primarily comprises a motor 15, belt drive 16, shaft 17, driving worm 18, gear 19 meshing with said worm, shaft 20 rotated by gear 19 and a friction drive wheel 21 splined on the shaft 20 and engaging the under side of the turntable. As the friction drive wheel 21 must be moved laterally or transversely of the turntable while driving the same, this is accomplished by drive means including a worm 22 on the post 3, gear 23 driven by said worm and which in turn drives a lead screw 24 which latter drives a carriage 25 connected with the drive wheel 21. It is thus seen that the turntable drives said lead screw and the latter moves the carriage whereby to shift the drive wheel during the driving of the turntable.

The carriage is connected with the reproducing and recording head 4 so as to cause the stylus in use to move transversely of the record corresponding to the movement of the drive wheel 21. Accordingly a lever 26 is pivoted at one end as at 27 upon an adjustable fulcrum member 28 on the wall 29 of the cabinet A1. The other end of the lever has a ball and socket connection 30 with the carriage 25 and as said lever is moved with the carriage, motion is transmitted to the recording and reproducing head 4 through a link 31 and a crank arm 32 which latter is carried by the lower end of the rotary post 8.

Inasmuch as the styli 5 and 6 are mounted side by side a compensating adjustment must be made when setting one of the styli for engagement with the record. This is accomplished by moving the fulcrum block 28 laterally between adjustable stops 33 and 34. Movement of this block is effected by using a screw 35 as a handle exteriorly of the wall 29. Upon tightening the screw the compensating adjustment may be maintained.

Provision is made for a back-spacing operation of the recording and reproducing head 4 by remote control from the master station B and sub-station C. This provides for reproduction at will of recorded matter which is audible at the master and other stations. This means is controlled by the push button switches P and P1 at said stations, and when operated, energizes the solenoid 39, the armature 40 of which is connected with and operates a crank arm 41. This crank arm and armature are normally held in operative position by a spring 42 and the crank arm is fixed to a rotary shaft 43 having a short crank arm 44 which engages in a notch 45 formed in a nut member 46. The nut member 46 constitutes a part of the carriage 25 and is carried on an arm 47 which is pivoted as at 48 and depends from one side of a yoke 49 which constitutes the body of the carriage. The yoke 49 is rotatably secured to the hub 50 of the drive wheel 21 by a pin 51 engaging with a groove 52 in said hub. Opposite faces of the nut member 46 are screw-threaded and one of said faces is adapted to engage with the lead screw 24, whereas the other face is adapted to engage with a similar lead screw 53 mounted in spaced parallel relation to the lead screw 24. The lead screw 53 is driven by a gear 54 fixed thereto and which meshes with a gear 55 fixed on the lead screw 24. At this lead screw 53 is rotated in the opposite direction to the lead screw 24 it is seen that when the nut 46 is engaged with the lead screw 53 the carriage 25 and drive wheel 21 will be moved back to starting position, that is toward the outer periphery of the turntable. This of course, likewise moves the recording and reproducing head 4. When the solenoid 39 is energized and the crank arm 41 moves downwardly, the short crank arm 43 swings to the right of its position shown in Fig. 7 and swings the arm 47 so that the nut member 46 will move clear of lead screw 24 into engagement with the lead screw 53. The spring detent 56 operates to releasably hold the arm 47 in its operative positions. At the same time that this action takes place an angular link 57 connected with the crank arm 41 and the head 4 operates to tilt the head vertically on the pivot 7 so that the stylus is lifted clear of the record and maintained in such position throughout energization of said solenoid. This link 57 has a pin and slot connection 58 with an extension 59 on the inner end of the head 4. In addition to lifting the head 4 clear of the record the solenoid 39 also functions when energized to lift the turntable 1 whereby the drive means and head 4 are free for back-spacing and return-to-starting-point movements. When the shaft 43 is turned by the crank arm 41 upon energization of said solenoid, a lever 60 fixed at one end to said shaft and engaging at its other end a shoulder 61 on the post 3, operates to lift said post and the turntable 1 thereon, whereby the latter is free from contact with the drive wheel 21.

When the operator at either the master or the sub-station during a transcription operation of the system P and P1 manipulates one of the switches so as to deenergize the solenoid 39, the spring 42 lifts the crank arm 41 and armature 40 and in so doing retracts the link 57 and the lever 60 whereby the stylus 6 is lowered to operative position and the turntable 1 is likewise lowered into contact with the drive wheel 21. At the same time the short crank arm 44 swings the nut 46 from contact with lead screw 53 back into engagement with the lead screw 24, and the recording and reproducing means is therefore restored to operative condition whereby reproducing operation is automatically resumed.

*Automatic motor cut-off*

When the drive wheel 21 and recording head reach the inner limits of travel relative to the turntable 1 and the record 2, a projection 63 on a carriage supporting pointer 64 (see Fig. 11) operates to open a normally closed spring actuated circuit closer 65 which opens the circuit for the motor, also the circuits for the tell-tale light signal B7 and A8, on the master station B (or B1 and A1).

Figure 11:
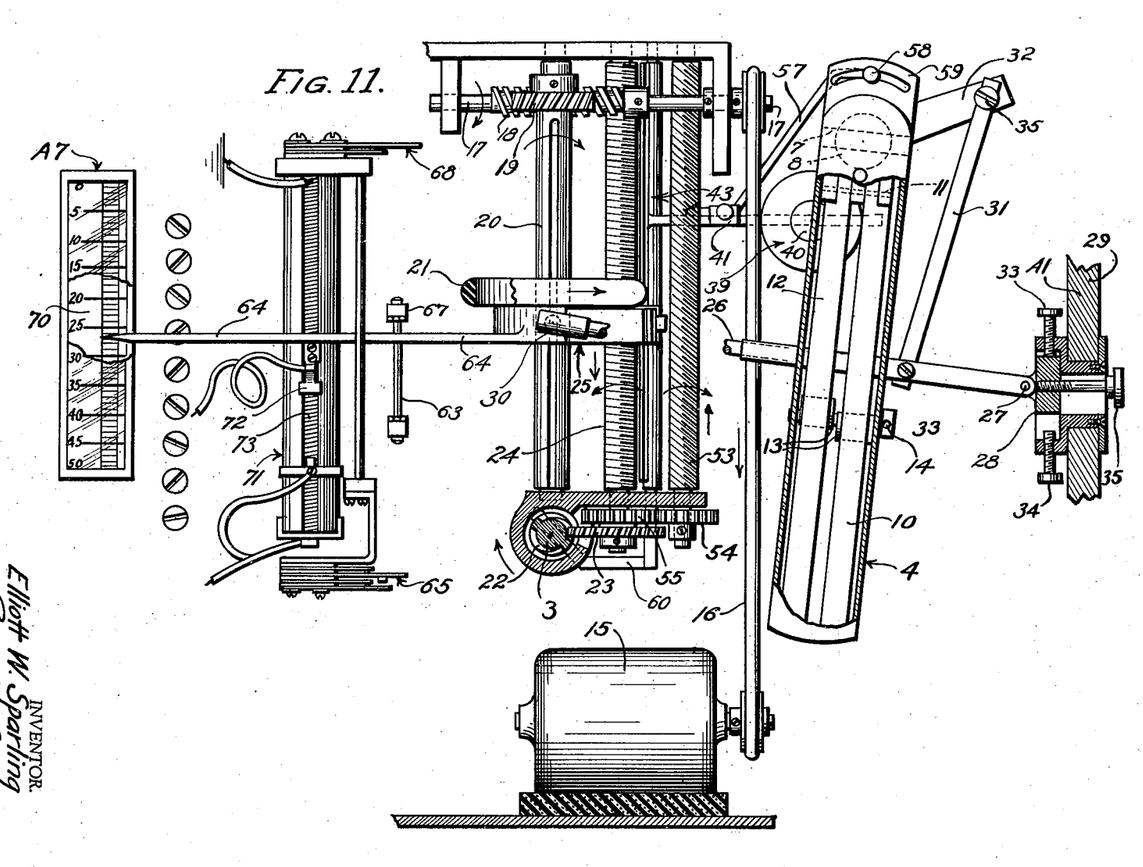
Fig. 11 is an enlarged fragmentary plan view of the drive means for the recording and reproducing mechanism, also showing the stylus position indicator.

A similar projection 67 on the pointer 64 operates to open a circuit closer 68 when the drive wheel 21 and head 4 reach the outer limits of travel thereof as when moved by the backspacing lead screw 53. This cuts off the solenoid 39. It is now seen that should the operator maintain the solenoid energized up to the point when the nut 46 reaches the end of its travel on the lead screw 53, the movement of the nut will be automatically stopped due to the switch 68 shutting off the solenoid 39. When the solenoid is deenergized the nut will be moved back to the lead screw 24 by action of the spring 43 as hereinbefore described.

*Stylus position indicators*

The stylus position indicator A7 of the monitor unit A comprises a graduated scale 70 over which the pointer 64 is moved by the carriage 25 in correspondence with the movement of the drive wheel 21 and recording and reproducing head 4 whereby the monitor operator may ascertain at a glance the position of the styli 5 and 6 on the record 2. The master station indicator B4 is in effect a volt meter having graduation indicia corresponding to that of scale 64. This volt meter is operated by a rheostat or variable resistor 71 of which the movable member 72 is fixed to the pointer and moves therewith in operative engagement with exposed portions 73 of the winding of said rheostat as shown in Fig. 11. This provides for simultaneous and identical indication by the indicators A7 and B4.

*Station-to-station communication circuit*

Figures 3, 13:
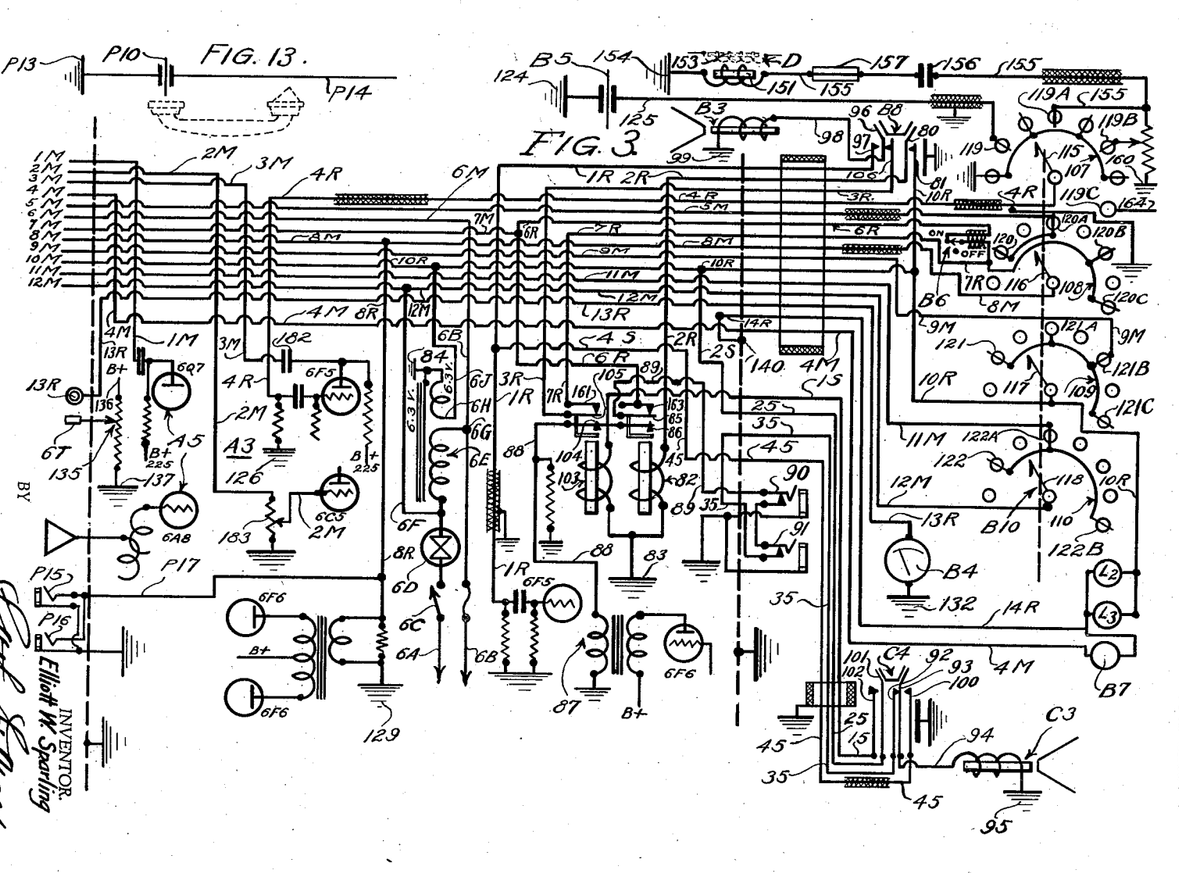
Fig. 3 is a partial wiring diagram of the station-to-station communication system and associated circuits and elements.
Fig. 13 is a diagram showing the circuit and the modified form of pick-up means.
Figure 4:
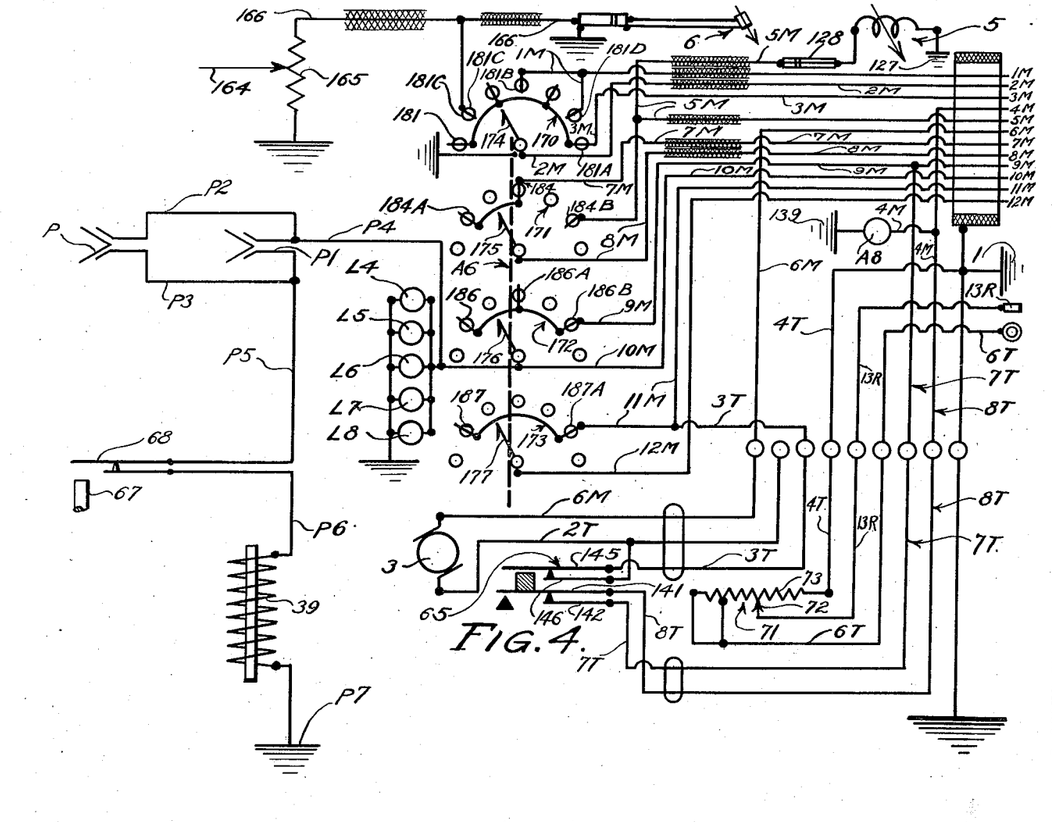
Fig. 4 is a partial wiring diagram of electrical circuits employed in the system and which are connected with the circuits shown in Fig. 3 to form the complete system diagram.

Referring to Figs. 3 and 4 which jointly show the electrical circuits of a complete system under this invention, it is seen from Fig. 3 that the electrical energy for the system is supplied from a 110 volt A. C. source not shown, through conductors 6A and 6B. The conductor 6A is connected through a main line switch 6C and voltage regulator 6D to one side of a transformer 6E and from which side a conductor 6F leads to a system connecting conductor line 12M. The other line conductor 6B is connected at 6G with the other side of transformer 6E and from thence extends to the system conductor 6M.

When the operator at the master station B wishes to speak through said station to substation C the switch B8 is operated to move from its normal position shown in Fig. 3 to position connecting the speaker B3 for use as a microphone and speaker C3 for use as a loud speaker. On this operation of switch B8 a circuit is established from 6.3 volt, tap 6H of transformer 6E, by conductors 6J, and 10R, engaged contacts 80 and 81 of switch B8, relay 82, ground 83 and transformer ground 84, whereby to energize relay 82. This causes relay contacts 85 and 86 to engage and establish a circuit to connect sub-station speaker C3 for its normal function as a loud speaker and master station speaker B3 for use as a microphone as follows, the amplifier section 87 of the main amplifier A3, output conductor 88, contacts 85 and 86, conductor 89, jacks 90 and 91, conductor 35, contacts 92 and 93 of sub-station switch C4, conductor 94, speaker C3 and ground 95, whereas for speaker B3 the circuit is established through input conductor 1R, contacts 96 and 97 of master station switch B8, conductor 98, master station speaker B3 and ground 99 thereby connecting the speaker B3 for use as a microphone.

To speak through the sub-station speaker C3 the operator at sub-station C closes switch C4 and speaker C3 is connected as a microphone while speaker B3 operates as a loud speaker as follows. For speaker C3 the circuit includes input conductor 1R, conductor 48, contacts 100 and 93, conductor 94, speaker C3, ground 95; for speaker B3 the circuit is established from transformer 6E, conductor 6J, conductors 10R, and 2S, contacts 101 and 102 of switch C4, conductor 1S, relay 103 and ground 83. Relay contacts 104 and 105 now engage and the circuit for speaker B is established from output conductor 88 of amplifier section 87, contacts 104 and 105, conductor 3R, contacts 106 and 96 of master station switch B8, conductor 98, loud speaker B3 and ground 99 whereby the speaker B serves its normal purpose as a loud speaker to reproduce messages from sub-station C.

*Recording circuits*

To record at the monitor station the dictation or messages transmitted from the master station B, the master station gang switch B10, consisting of four decks 107, 108, 109 and 110, is manipulated so that the pointer 111 is moved from the "off" designation 112 of the dial 113 to position opposite the dictate designation 114, and the movable contacts 115, 116, 117, and 118 are correspondingly moved, each to engage the contacts 119, 120, 121 and 122 of the several contacts associated with each switch deck as shown in Fig. 3. Considering first deck 107, it is seen that the engagement of the movable contact 115 with contact 119 connects the microphone B5 at the master station B with the input terminal of the main amplifier A3, as follows, ground 124, microphone B5, conductor 125, contacts 119 and 115, conductor 4R to amplifier A3 having the ground 126 to complete the microphone circuit. At this time the contact 116 engages with contact 120 which is electrically connected with contact 120A and the recording head and stylus 5 (see Fig. 3) is connected with the output terminal of the amplifier A3, (reading from Fig. 4 to Fig. 3) ground 127, recording head and stylus 5, plug 128, and conductor line 5M to contacts 120A, 120 and 116, conductor 8M and conductor 8R connecting 8M to output unit of the amplifier A3, which unit has a ground connection 129.

The motor 3 is started simultaneously with the connecting of the microphone B5 in the recording circuit, through the operation of the fourth deck 110 of the master station gang switch B10. This motor circuit is established from a 110 volt A. C. line conductor 6B, conductor 6M, (read from Fig. 3 to Fig. 4) motor 3, conductor 2T, the automatic and normally closed switch 65, conductor 3T, conductor 11M, (now read from Fig. 4 to Fig. 3) stationary contacts 122A and 122, movable contact 118, conductor 12M, and conductor 6F to the other A. C. input line 6A.

It is seen that when the operator at the monitor station has set the head 4 with the recording stylus on the record 2, the master station operator may speak into the microphone B5 and cause such speech or in fact, any sound picked up by said microphone, to be recorded on the record 2 at the monitor station, immediately that the gang switch B10 is turned to the recording or dictation position such that pointer 111 is opposite the designation 114 of the dial 113 (see Fig. 2) of said master gang switch B10.

Recording station-to-station conversations

It should be noted that while the system is operative to record signals, messages, etc., from the master station B, the station-to-station circuits are undisturbed and are operative at will. Should the master station operator operate switch B8 to connect speaker B as a microphone, while the microphone B5 is connected with the recording unit, such speech while being transmitted to the sub-station, will also be picked up by the microphone and recorded as hereinbefore explained. Moreover when the speaker unit A3 broadcasts messages and sounds transmitted thereto from the sub-station C, such sounds are also picked up by microphone A5 and thereby recorded when the microphone A5 is connected as above noted, for recordation of sounds picked up thereby. It is thus seen that conferences and conversations in the room where the stations B and C etc. are located, may be picked up and recorded as desired.

Stylus position indicator circuits

During the operation of the recording and reproducing means the pointer 64 of the mechanical stylus position indicator A7 of the monitor unit, operates the rheostat 71 so that the volt meter indicator B4 will correspond in its indication to that of indicator A7. Referring to Figs. 3 and 4 in the order named, it is seen that the circuit for indicator B4 is established through the ground 132, indicator B4, conductor 13R (now read Fig. 4) movable member 72 of rheostat 71 and conductor 4T to ground 132a. Since the element 72 moves with pointer 64, the resistance of member 71 will vary whereby the indicator B4 will correspond in reading to the indicator A7. From the rheostat 71 in Fig. 4, conductor 6T extends (now read Fig. 3) to voltage bleeder and divider 135 having a source voltage at 136 and provided with a ground connection 137 whereby to supply voltage to this circuit.

Tell-tale signal light circuits

The tell-tale signal lights A8 and B7 at the monitor and master stations A and B are shown in Figs. 4 and 3 respectively. Circuits for these lights are established as follows: one side of light A8 is grounded as at 139 (see Fig. 4) and one side of light B7 (see Fig. 3) is grounded through conductor 14R and ground element 140. The other side of light B7 is connected to the other side of light A8 (see Fig. 3) by conductor 4M (now read Fig. 4). Conductor 8T connects 4M with normally closed contacts 141 and 142 from which latter conductor 7T leads to conductor 9M which (now read Fig. 3) extends to connected contacts 121, 121A, 121B and 121C of deck 109 of gang switch B10 of the master station B. When movable contact 117 is engaged with any of said 121 series of contacts the circuit is completed, through 10R to the 6.3 volt tap 6H of power transformer 6E. Thus the master station light B7 and the monitor station light A8 are lit when the monitor is in operation to record, reproduce and broadcast. The automatic switch 65 operates to open the circuit for these tell-tale lights when the projection 63 is moved by the carriage 25 for the drive wheel 21 to engage said switch to cut off motor 3. Said circuits for said lights are opened by disengagement of motor circuit contacts 145 and 146 and like separation of light circuit contacts 141 and 142 both embodied in switches 65 and 68. The lights being off will indicate to station operators at the master and monitor stations that the recording head is not in operative position, since after the motors are automatically shut off the light will remain off until the head is restored to an operative or starting position.

Telephone recording and pick-up circuits

When the master station operator wishes to connect the pick-up means D for recording outgoing or incoming messages from an adjacent telephone or other similar communication system, the gang switch B10 is operated to bring pointer 111 opposite the dial indication 150 which is marked to indicate telephone recording. At this time deck 107 has the contact 115 and 119A engaged and induction coil 151 of pick-up means D which is placed adjacent the telephone system coil 153 (see Fig. 3) and grounded at 154 is connected to the input side of the amplifier A3 through conductor 4R, contacts 115 and 119A, conductor 155 having condenser 156 and plug 157 connected therein.

Deck 108 of gang switch B10 has its contact 116 engaged with contact 120A which is connected with contact 120 so that deck 108 functions as when the switch is set for dictation recording as previously described, whereby the recording head and stylus 5 are connected to the output side of the main amplifier A3 (see Fig. 3) through conductors 8R and 8M, contact 116, contact 120A, conductor 5M (now read Fig. 4) to recording stylus 5. Then the master station operator may at will cause incoming or outgoing telephone messages to be recorded as desired while at the same time, providing for the ordinary reception of such messages through the inter-office telephone system.

Deck 109 operates on this position of the master gang switch in the same manner as when the gang switch is in the first operative position for dictation recording.

Deck 110 operates the same as when the first operative position of the gang switch to connect the motor 3.

Telephone broadcast circuit

The gang switch B10 is moved to its third position of operation (from left to right) to establish a circuit including loud speaker unit B3 of the master station B and the pick-up means D. In this position of said gang switch the decks 107, 108, 109 and 110 operate as follows:

Deck 107 has contact 115 engaged with contact 119B. This connects the pick-up coil 151 with the input side of amplifier A3 through conductor 4R, contact 115, contact 119B, volume control 159 having ground connector 160 and conductor 155.

Deck 108 (as in its third operating position) has its contact 116 engaged with contact 120B and loud speaker unit B3 is connected to the output side of the amplifier A3 through conductors 8R and 8M, contact 116, contact 120B, conductor 7R, normally closed relay contacts 161 and 105, conductor 3R, normally closed contacts 106 and 96, conductor 98 and speaker B3 to ground 99. It should be noted at this point that master station switch B6 in one position (that shown in Fig. 3) connects speaker unit C3 of the sub-station C in parallel with speaker B3 whereby both stations will broadcast at the same time, but in its other or "off" position disconnects the sub-station speaker C3, permitting reception at the master station B only. Speaker C3 is connected in parallel with speaker B3 through switch B6, conductor 6R, normally closed relay contacts 163 and 85, conductor 89, jacks 90 and 91, conductor 35, normally closed contacts 92 and 93 of substation switch C4, conductor 94 and speaker C3 to ground 95. It should also be noted at this point that earphones may be plugged in at the jacks 90 and 91 for use instead of the loud speaker C3.

Deck 109 operates the same as when the gang switch is in its first position of operation thereby to actuate the signals A8 and B7.

Deck 110 in the third operation position of gang switch B10 has its movable contact out of contact with the stationary deck contacts, or in off position, inasmuch as the motor 3 is not needed when broadcasting telephone and like messages.

*Transcribing or reproducing circuits (fourth operating position on gang switch B10)*

In this position of gang switch the decks 107, 108, 109 and 110 thereof operate as follows:

Deck 107 has its contact 115 contacted with contacts 119C whereby to connect reproducing head and stylus 6 to the input side of amplifier A3, through conductor 4R, contact 115, contact 119C, conductor 164, (now read left upper side Fig. 4) and through volume control resistor 165, conductor 166 to reproducer head and stylus 6.

Deck 108 (operating position 4) has its contact 116 disposed in contact with contact 120C which is connected with conductor 7R. Thus if the switch B6 is in its "on" position as shown in Fig. 3, the two speakers are connected, in parallel in the same manner as when the gang switch deck 108 is in its third operating position as previously described.

Deck 109 in its fourth operating position has its contact 117 engaged with contact 121C and operating in the same manner as when in its other operating positions to energize the telltale lights A8 and B7.

Deck 110 in its fourth operating position has its contact 118 engaged with contact 122B which is connected with contact 122 and 122A being the first and second operating position contacts, whereby to close the motor circuit as described in connection with the first operating position thereof.

It should be noted that the first position of the gang switch B10 is an "off" position, that a corresponding shut off position is provided between each operating position whereby the switch may be moved progressively from left to right to reflect its several operating positions although it may be moved from one operating position to another as desired.

As shown in Fig. 3 the lights L2 and L3 are provided for illuminating the indicator B4 and gang switch dial 113 and are energized whenever the amplifier A3 is operated.

*Monitor station gang switch (A6)*

As shown in the wiring diagram, Fig. 4, the monitor station gang switch A6 comprises four decks 170, 171, 172 and 173, having corresponding movable contacts 174, 175, 176 and 177 operating simultaneously when the knob 178 is turned. On the knob is a pointer 179 cooperating with the off "transcribe, off radio, off radio recording" and "off" designations appearing on the dial 180. This gang switch therefore has three operating positions and provides for control of the system in a manner substantially the same as with master station gang switch B10.

In its normal or first "off" position the four decks of switch operate as follows:

Deck 170 has its contact 174 engaged with contact 181 which is connected with contact 181A whereby the plate of first input tube 6F5 is connected to the second input 6C5 through condenser 182, (see Fig. 3) conductor 3M, (now read Fig. 4) contacts 181A, 181 and 174, conductor 2M, (now read Fig. 3) to grid input of 6C5.

Decks 171, 172 and 173 perform no circuit closing functions.

*Transcribing circuit (when monitor station gang switch is on its first operating position)*

When the gang switch A6 is set for transcribing, the four decks serve as follows:

Deck 170 connects reproducing head and stylus 6 (see Fig. 4) through conductor 166, deck contact 181C, contact 174, conductor 2M, (now read Fig. 3) volume control 183 to input tube 6C5 through the amplifier to the 6F6 output unit.

Deck 171 connects the loud speaker C3 through (see Fig. 3) conductor 94, contacts 93 and 92 of switch C4, conductor 35, jacks 91 and 90, conductor 89, then closed relay contacts 85 and 163, conductor 6R, conductor 7M, (now read Fig. 4) deck contacts 184 and 184A, contact 175, conductor 8M, (now read Fig. 3) and through conductor 8R to the output stage of amplifier A3. It should be noted that the earphones may be plugged in at the jacks 90 and or 91 to disconnect speaker C3 if desired. Speaker B3 also operates at this time to broadcast the transcription from the stylus head 6, as said speaker is then connected with the output stage of the amplifier, through conductor 98, contacts 96 and 106, conductor 3R, then closed contacts 105 and 161, conductor 7R, switch B6 (provided the latter is in the "on" position) conductor 6R, conductor 7M (now read Fig. 4) contacts 184, 184A, contact 175, conductor 8M (now read Fig. 3) conductor 8R to output stage of amplifier A3. When switch B6 is off the loud speaker C3 only is in the circuit.

Deck 172, when in "transcribe" position, has its contact 176 engaged with contacts 186 which is connected with contacts 186A and 186B. This closes the circuits for tell-tale lights A8 and B7. One side of light A8 is grounded at 139 (Fig. 4) and one side of light B7 is grounded through conductor 14R. The other side of B7 (Fig. 3) is connected to the other side of A8 through conductors 4M, (now read Fig. 4) 8T, automatic switch 65 conductors 7T, 9M, gang switch contacts 186B, 186, 176, conductor 10M (now read Fig. 3) conductor 6J to 6.3 volt line of transformer 6E.

It should be noted at this point that lights L4, L5, L6, L7 and L8 shown in Fig. 4, are lit when the system current is turned on through line switch 6C, the conductors 6J, 10M going directly to said lights (see Fig. 4), when the latter are grounded. These lights are placed to illuminate the controls of the monitor unit.

Deck 173 in the "transcribe" position turns on the motor 3, one side of which is connected from line conductor 6B (Fig. 3) by conductor 6M (now read Fig. 4). The other side of motor 3 is connected through main line conductor 6A, (see Fig. 3) switch 6C, voltage regulator 6D, conductor 6F, conductor 12M, (now read Fig. 4) deck contacts 177, 187 and 187A, conductors 11M and 3T, automatic switches 65 and 68 then closed, and to motor through conductor 2T, thus completing the motor circuit.

Radio broadcast circuit

When the gang switch A6 is in its second operating or radio broadcast position the decks thereof operate as follows:

Deck 170 connects the radio output tube 6Q7 of the radio set A5 (see Fig. 3) to conductor 1M (now read Fig. 4) deck contacts 181B and 174, conductor 2M (now read Fig. 3) to input tube 6C5 of main amplifier.

Deck 171 now connects in the circuit the substation or monitor unit speaker C3. Also speaker B3, provided switch B6 is in its "on" position, through deck contacts 184 and 175 then engaged the circuits being established in the same manner as when this deck is in its first "operating" or "transcribing" position.

Deck 172 functions as previously described, to control the light circuits for the tell-tale signals A8 and B7, only at this time through its contacts 176, 186A and 186B.

Deck 172 is in an "off" position and the motor circuit controlled thereby is open.

Radio recording circuit

When the gang switch A6 is in its third "operating" or radio recording position, the decks thereof operate as follows:

Deck 170 connects through contacts 174 and 181D the radio output tube 6Q7 to the input tube 6C5 of the main amplifier A3, in the same manner as described when the gang switch is in radio broadcasting position.

Deck 171 through its contacts 175 and 184B now connects recording head 5 to the output transformer of the main amplifier, as follows, from head or stylus 5, (Fig. 4) conductor 5M, deck contacts 184B and 175, conductor 8M, (now read Fig. 3) conductor 8R, to output side of main amplifier which is grounded at 129.

Deck 172 operates as before, through contacts 186B and 176 to close the circuits for the tell-tale lights A8 and B7.

Deck 173 closes the circuit for motor 3 of the recording unit through contacts 177 and 187A in the same manner as when the gang switch is moved to its first operating or "transcribing" position.

It will now be seen that by reason of the association and combination of the elements and circuit of this system as hereinbefore described and as illustrated in the accompanying drawing, the objects and purpose as set forth herein may be obtained in a particularly efficacious manner.

Back spacing circuit and control means therefor

When either of switches A6 and B10 is in transcribing position, the operators at the master station B and sub-station C may backspace the reproducing stylus 6 at will, by closing the push button switches P or P1. This will permit these operators to repeat transcriptions as desired, without leaving their stations and is a convenient and time saving feature of this system.

As shown in Fig. 4, the deck spacing switches P and P1 are connected in parallel by conductors P2, P3, P4, P5, 10M, 10R and 6J with the 6.3 volt tap of the transformer 6E and the switch 68 respectively. Switch 68 is normally closed and connected by a conductor P6 with the solenoid 39 which latter is ground as at P7. It is thus seen that when either switch P and P1 is closed the solenoid 39 will be energized and will operate as hereinbefore described to back space the reproducing stylus. Immediately either push button is released the stylus is restored to operative position on the record, as noted on page 4 hereof and reproduction or transcription is automatically resumed. Thus the operator may determine the back spacing movement of the stylus 6 by the length of time the switches P and P1 are closed.

With further reference to Fig. 4, also Fig. 11, it is seen that the projection 67 encounters switch 68, as would take place at the outer limits of back spacing movement of the assembly 4, and said switch opens and deenergizes the solenoid 39. As previously described on page 4 hereof, the nut 46 is returned to engagement with the lead screw 24 and the normal transcribing movement will be resumed.

Modified form of phone pick-up

As shown in Figs. 12 and 13, a variational form of pick-up means comprises a microphone P10 which is provided with spaces or openings indicated at P11 or otherwise constructed whereby when placed in or adjacent to the human ear, for example, by means of head band P12, will permit free passage of sound from a telephone ear piece to the human ear, yet pick up the sounds transcribed in the telephone system. With the use of this microphone telephone messages may be readily picked up without connection with the telephone equipment, or interfering with the normal phone reception and use.

As shown in Fig. 13 the microphone P10 is electrically connected in the circuit of the system in the same manner as is the pick-up means D, the ground P13 and conductor P14 corresponding to the ground 124 and conductor 125 as employed with the pick-up means D.

Monitor jacks

As shown in Fig. 4, monitor jacks P15 and P16 are ground at P17 and connected by conductor P18 to conductor 8R, conductor 8R to output of the main amplifier. These jacks provide for earphone reception of all reproductions in the system without interfering with the normal functions of the other sound reproducing elements of the system.

I claim:

1. A combined signal recording, reproducing and communication system comprising a plurality of electrically connected stations arranged for inter-station communication, signal recording means, signal reproducing means, a phonographic means including a record common to said recording and reproducing means, and control means at the location of at least one of said stations for selectively controlling the operation of said stations, recording means and said reproducing means.

2. A combined sound recording, reproducing and communication system comprising a plurality of electrically connected stations arranged for audible inter-station communication, sound recording means, sound reproducing means, a phonographic means including a record for co-operation with said recording and reproducing means, and control means at the location of at least one of said stations for controlling all of said stations and for selectively effecting the operation of said sound recording and reproducing means for recording on said record sound transmitted from one of said stations and reproducing from said record said recorded sound at a selected station.

3. A combined sound recording, reproducing and communication system comprising a plurality of electrically connected stations arranged for audible inter-station messages, phonographic means for recording and reproducing said messages, and control means at the location of at least one of said stations for selectively effecting the operation of said phonographic means for recording sound transmitted from one of said stations and reproducing the sound thus recorded at a selected station while maintaining operable inter-station communication connections between stations of the system.

4. A combined signal recording, reproducing communication system comprising a plurality of electrically connected stations including means for effecting inter-station communication by audible and visual signals, phonographic means selectively operable to record and reproduce said audible signals, control means operable at the location of at least one of said stations for selectively effecting the operation of said phonographic means.

5. A combined signal recording, reproducing communication system comprising a plurality of electrically connected stations including means for effecting inter-station communication by audible and visual signals, signal recording means, signal reproducing means, a phonographic means including a record common to said recording and reproducing means, and control means operable at the location of at least one of said stations for selectively effecting the operation of said recording and reproducing means while maintaining inter-station communication connections between stations of the system.

6. A combined signal recording and communication system comprising a plurality of electrically connected stations arranged for inter-station communication, signal recording means, and control means at the location of at least one of said stations for controlling the operation of said recording means and electrically operated signal means visually indicating at a station removed from said recording means the extent of operation of said recording means.

7. A combined sound recording and communication system comprising a plurality of electrically connected stations arranged for audible inter-station communication, sound recording means, and control means at the location of at least one of said stations and said recording the operation of said stations and said recording means, and electrically operated signal means at the location of said control means for visually indicating the extent of operation of said recording means.

8. A combined sound recording and communication system comprising a plurality of electrically connected stations arranged for audible station-to-station communication, sound recording means, inductive pick-up means for receiving signals from an electrical circuit for transmitting such signal, sound recording means selectively operative to make a record of audible station-to-station communications and signals received by said pick-up means, and control means at the location of at least one of said stations for controlling the operation of said recording means and said pick-up means.

9. A combined sound recording, reproducing and communication system comprising a plurality of electrically connected stations arranged for station-to-station communication, inductive pick-up means for transmitting to at least one of said stations a signal picked up from a signal transmitting means which is without said system, recording means for recording station-to-station communication and signals received by said pick-up means, reproducing means for reproducing audibly at at least one of said stations the communication and signals which have been recorded by said recording means, and control means at the location of at least one of said stations for controlling the operation of said pick-up means and said recording means.

10. A combined sound recording, reproducing and communication system comprising a plurality of electrically connected stations arranged for station-to-station communication, inductive pick-up means for transmitting to at least one of said stations a signal picked up from a signal transmitting means which is without said system, phonographic recording means for recording station-to-station communication and signals received by said pick-up means, phonographic reproducing means for reproducing audibly at at least one of said stations the communication and signals which have been recorded by said recording means, and electrical means including controls operative at the location of at least one of said stations for selectively connecting said station for inter-station communication, recording a station-to-station communication, recording a signal received by said pick-up means, and audibly reproducing at one or more of said stations, the matter which has been transmitted to and recorded by said recording means.

11. The combination with a telephone system including a telephone station having sending and receiving equipment, of communication means comprising a plurality of stations affording station-to-station communication independently of said telephone system, an induction pick-up means operative for picking up signals transmitted to and from said telephone station and for transmitting said signals to said communication stations, and control means operative at the location of at least one of said stations of said communication means for selectively controlling said pick-up means and said communication stations.

12. A system of the character described comprising a monitor station including electrically operated sound recording means and electrically operated sound reproducing means, a communication system comprising a master station located at a point remote from said monitor station and a sub-station located at the monitor station, said master station including a microphone and an electrically operative loud speaker also subject to use as a microphone, said sub-station comprising an electrically operated loud speaker subject to use as a microphone, thermionic amplifying means, electrical circuits interconnected with one another and the electrical elements of the communication system, circuit control means at said master and sub-stations operable at will to connect the speaker of the one thereof in said circuits for use as a microphone while the speaker of the other communication station is connected for audible reproduction of the sound transmitted from the microphone connected speaker, a master station circuit control means for selectively connecting said microphone in circuit with said recording means for recording sound picked up by said microphone, and actuating and connecting said reproducing means in circuit with a communication station loud speaker for audibly reproducing recorded sounds, and another circuit control means operable at the master station for connecting either or both of said station loud speakers with the circuit which includes the reproducing means for audibly reproducing sounds simultaneously or selectively at the master and sub-station.

13. A system of the character described comprising a monitor station including electrically operated sound recording means and electrically operated sound reproducing means, a communication system comprising a master station located at a point remote from said monitor station and a sub-station located at the monitor station, said master station including a microphone and an electrically operative loud speaker also subject to use as a microphone, said sub-station comprising an electrically operated loud speaker subject to use as a microphone, thermionic amplifying means, electrical circuits interconnected with one another and the electrical elements of the communication system, circuit control means at said master and sub-station operable at will to connect the speaker of one thereof in said circuits for use as a microphone while the speaker of the other communication station is connected for audible reproduction of the sound transmitted from the microphone connected speaker, a master station circuit control means for selectively connecting said microphone in circuit with said recording means for recording sound picked up by said microphone, and actuating and connecting said reproducing means in circuit with a communication station loud speaker for audibly reproducing recorded sounds, an inductive pick-up means operable in said circuits for picking up messages and sounds from a telephone or like system, and means embodied in said circuits and said master station circuit control means for connecting said pick-up means in the circuits for the recording means, the reproducing means and the loud speakers of said stations, whereby incoming and outgoing messages and sounds in said telephone system may be either recorded or broadcast at the time of reception or subsequently broadcast from the recording thereof.

14. The combination with a telephone system including a telephone station having sending and receiving equipment, of communication means comprising a plurality of stations affording station-to-station communication independently of said telephone system, and induction pick-up means operative for picking up signals transmitted to and from said telephone station and for transmitting said signals to said communication stations, phonographic recording means for recording telephone messages transmitted by said pick-up means and interstation communications, and control means operable at the location of at least one of the stations of said communication means for selectively controlling said pick-up means, said recording means and the operation of said communication stations.

15. The combination with a telephone system including a telephone station having sending and receiving equipment, of communication means comprising a plurality of stations affording station-to-station communication independently of said telephone system, and induction pick-up means operative for picking up signals transmitted to and from said telephone station and for transmitting said signals to said communication stations, phonographic recording means for recording telephone messages transmitted by said pick-up means and also interstation messages, said recording means including a reproducing head and associated means for reproducing messages recorded by said recording means, and control means operable at the location of at least one of the stations of said communication means for selectively controlling said pick-up means, said recording means and the operation of said communication stations and reproducing means.

16. A system of the character described comprising a monitor station including electrically operated sound recording means, and electrically operated sound reproducing means, in combination with a communication system including a master station located at a point remote from said monitor station and a sub-station located at the monitor station, said master station including an electrically operative loud speaker subject to use as a microphone, said sub-station comprising an electrically operated loud speaker subject for use as a microphone, thermionic amplifying means, electrical circuits interconnected with one another and the electrical elements of the system, circuit control means at said master station and said sub-station operable at will to connect the speaker of one thereof on said circuits for use as a microphone while the speaker of the other station is connected for audible reproduction of the sound transmitted from the microphone connected speaker, circuit control means at the master station selectively operable to connect the speaker of the master station when used as a microphone, in circuit with said recording means for recording sound transmitted from said speaker, to actuate said reproducing means and connect same with a selected station speaker for audible reproduction of the recorded sounds.

17. A system of the character described comprising a monitor station including electrically operated sound recording means, and electrically operated sound reproducing means, in combination with a communication system including a master station located at a point remote from said monitor station and a sub-station located at the monitor station, said master station including an electrically operative loud speaker subject to use as a microphone, said sub-station comprising an electrically operated loud speaker subject for use as a microphone, thermionic amplifying means, electrical circuits interconnected with one another and the electrical elements of the system, circuit control means at said master station and said sub-station operable at will to connect the speaker of one thereof in said circuits for use as a microphone while the speaker of the other station is connected for audible reproduction of the sound transmitted from the microphone connected speaker, circuit control means at the master station selectively operable to connect the speaker of the master station when used as a microphone, in circuit with said recording means for recording sound transmitted from said speaker, to actuate said reproducing means and connect same with a selected station speaker for audible reproduction of the recorded sounds, one of said stations other than the monitor station having a microphone connected in the electrical circuits of the system and means for rendering said microphone operative or inoperative for transmitting messages for recordation at said monitor station.

18. The combination with a telephone system including a telephone station having sending and receiving equipment, of communication means comprising a plurality of stations affording station-to-station communication indepently of said telephone system, and induction pick-up means operative for picking up signals transmitted to and from said telephone station and for transmitting said signals to said communication stations, phonographic recording means for recording telephone messages transmitted by said pick-up means and also inter-station messages, said recording means including a reproducing head and associated means for reproducing messages recorded by said recording means, and control means operable at the location of at least one of the stations of said communication means for selectively controlling said pick-up means, said recording means and the operation of said communication stations and reproducing means, and a microphone located at at least one of the plurality of stations which are independent of the telephone system for transmitting messages from said one station for recordation by said recording means.

19. The combination with a telephone system including a telephone station having sending and receiving equipment, of communication means comprising a plurality of stations affording station-to-station communication independently of said telephone system, induction pick-up means operative for picking up signals transmitted to and from said telephone station and for transmitting said signals to said communication stations, phonographic recording means for recording telephone messages transmitted by said pick-up means and also inter-station messages and control means operable at the location of at least one of the stations of said communication means for selectively controlling said pick-up means, said recording means and the operation of said communication stations.

ELLIOTT W. SPARLING.